US012684617B2

(12) United States Patent
Park

(10) Patent No.: US 12,684,617 B2
(45) Date of Patent: Jul. 14, 2026

(54) METHOD AND DEVICE FOR PERFORMING WIRELESS COMMUNICATION IN UNLICENSED BAND

(71) Applicant: KT CORPORATION, Gyeonggi-do (KR)

(72) Inventor: Ki-Hyeon Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 511 days.

(21) Appl. No.: 17/274,321

(22) PCT Filed: Sep. 4, 2019

(86) PCT No.: PCT/KR2019/011417
§ 371 (c)(1),
(2) Date: Mar. 8, 2021

(87) PCT Pub. No.: WO2020/050630
PCT Pub. Date: Mar. 12, 2020

(65) Prior Publication Data
US 2021/0352724 A1     Nov. 11, 2021

(30) Foreign Application Priority Data

Sep. 7, 2018   (KR) ........................ 10-2018-0107105
Sep. 2, 2019   (KR) ........................ 10-2019-0108134

(51) Int. Cl.
*H04W 74/0816*     (2024.01)
*H04L 5/00*     (2006.01)
(Continued)

(52) U.S. Cl.
CPC ....... *H04W 74/0816* (2013.01); *H04L 5/0051* (2013.01); *H04L 25/0226* (2013.01);
(Continued)

(58) Field of Classification Search
CPC   H04W 74/0816; H04W 72/02; H04L 5/0051; H04L 25/0226
See application file for complete search history.

(56) References Cited

U.S. PATENT DOCUMENTS

RE49,791 E      1/2024   Nory et al.
2016/0278048 A1   9/2016   Nory et al.
(Continued)

FOREIGN PATENT DOCUMENTS

CN      106470502 A     3/2017
CN      106664180 A     5/2017
(Continued)

OTHER PUBLICATIONS

European Patent Office, European Search Report of corresponding EP Patent Application No. 19857234.9, May 11, 2022.
(Continued)

*Primary Examiner* — Kevin M Cunningham
(74) *Attorney, Agent, or Firm* — IP Legal Services, LLC

(57)     ABSTRACT
Provided are a method and a device for performing wireless communication in an unlicensed band. The method of a UE for performing wireless communication in an unlicensed band may include: receiving, in a system band made up of a plurality of sub-bands, information for allocating a radio resource; acquiring, for at least one of sub-bands included in the radio resource, availability information based on the performing of Listen Before Talk (LBT); and transmitting the availability information.

9 Claims, 16 Drawing Sheets

(51) Int. Cl.
| | |
|---|---|
| *H04L 25/02* | (2006.01) |
| *H04W 72/02* | (2009.01) |
| *H04W 72/0453* | (2023.01) |
| *H04W 74/00* | (2009.01) |

(52) U.S. Cl.
CPC ....... *H04W 72/02* (2013.01); *H04W 72/0453* (2013.01); *H04W 74/006* (2013.01)

(56) References Cited

U.S. PATENT DOCUMENTS

| | | | |
|---|---|---|---|
| 2016/0278049 | A1 | 9/2016 | Nory et al. |
| 2016/0278050 | A1 | 9/2016 | Nory et al. |
| 2017/0086216 | A1 | 3/2017 | Patil et al. |
| 2017/0142593 | A1 | 5/2017 | Seo et al. |
| 2017/0311322 | A1 | 10/2017 | Kim et al. |
| 2017/0332395 | A1* | 11/2017 | Yin ................... H04W 72/1263 |
| 2017/0339693 | A1 | 11/2017 | Cierny et al. |
| 2017/0339717 | A1 | 11/2017 | Futaki |
| 2017/0367079 | A1 | 12/2017 | Nory et al. |
| 2017/0367092 | A1 | 12/2017 | Kim et al. |
| 2017/0367106 | A1 | 12/2017 | Kim et al. |
| 2018/0020435 | A1 | 1/2018 | Nory et al. |
| 2018/0124687 | A1 | 5/2018 | Park et al. |
| 2018/0124749 | A1 | 5/2018 | Park et al. |
| 2018/0199376 | A1 | 7/2018 | Kim et al. |
| 2018/0227936 | A1 | 8/2018 | Yerramalli et al. |
| 2018/0249499 | A1 | 8/2018 | Kim et al. |
| 2019/0174542 | A1* | 6/2019 | Lei ........................... H04L 5/006 |
| 2019/0246409 | A1 | 8/2019 | Kim et al. |
| 2019/0327752 | A1 | 10/2019 | Kim et al. |
| 2019/0357190 | A1 | 11/2019 | Park et al. |
| 2020/0022156 | A1 | 1/2020 | Kim et al. |
| 2020/0037354 | A1* | 1/2020 | Li ..................... H04W 74/0808 |
| 2020/0052803 | A1* | 2/2020 | Deenoo ................ H04B 17/318 |
| 2020/0068410 | A1 | 2/2020 | Seo et al. |
| 2020/0077323 | A1 | 3/2020 | Park et al. |
| 2020/0214023 | A1 | 7/2020 | Patil et al. |
| 2020/0267743 | A1 | 8/2020 | Kim et al. |
| 2020/0305193 | A1 | 9/2020 | Kim et al. |
| 2021/0037564 | A1 | 2/2021 | Futaki |
| 2022/0116152 | A1* | 4/2022 | Iyer ......................... H04L 1/188 |

FOREIGN PATENT DOCUMENTS

| | | |
|---|---|---|
| CN | 107005355 A | 8/2017 |
| CN | 107005386 A | 8/2017 |
| CN | 107079498 A | 8/2017 |
| CN | 107113143 A | 8/2017 |
| CN | 107113801 A | 8/2017 |
| CN | 107439046 A | 12/2017 |
| CN | 107667565 A | 2/2018 |
| KR | 10-2017-0111643 A | 10/2017 |
| KR | 10-2018-0022221 A | 3/2018 |
| KR | 10-2018-0049800 A | 5/2018 |

OTHER PUBLICATIONS

ZTE, "Considerations on UL reference signals and channels design for NR-U", R1-1808320, 3GPP TSG RAN WG1 Meeting #94, Gothenburg, Sweden, Aug. 20-24, 2018, pp. 1-6.

Spreadtrum Communications, "Discussion on UL Signals and Channels in NR-U", R1-1808798, 3GPP TSG RAN WG1 Meeting #94, Gothenburg, Sweden, Aug. 20-24, 2018.

Huawei et al., "NR frame structure and scheduling on unlicensed bands", R1-1803678, 3GPP TSG RAN WG1 Meeting #92bis, Sanya, China, Apr. 16-Apr. 20, 2018.

Huawei et al., "UCI transmission in NR operations in unlicensed", R1-1803682, 3GPP TSG RAN WG1 Meeting #92bis, Sanya, China, Apr. 16-Apr. 20, 2018.

Nokia et al., "RRM and Connect Mode mobility", R2-1812308, 3GPP TSG-RAN WG2 Meeting #103, Gothenburg, Sweden, Aug. 20-24, 2018.

Sony, "Considerations on channel access for NR unlicensed operations", R1-1806569, 3GPP TSG RAN WG1 Meeting #93, Busan, Korea, May 21-25, 2018.

ZTE, "Considerations on channel access procedure for NR-U", R2-1811281, 3GPP TSG RAN WG2 NR #103 Meeting, Gothenburg, Sweden, Aug. 20-24, 2018.

* cited by examiner

One subframe

Resource grid, 2deltaf

Resource grid, deltaf

Carrier bandwidth

One resource block-12 subcarriers,
subcarrier spacing 2deltaf

One resource block-12 subcarriers,
subcarrier spacing 2deltaf

METHOD AND DEVICE FOR PERFORMING WIRELESS COMMUNICATION IN UNLICENSED BAND

CROSS REFERENCE TO RELATED APPLICATIONS

This application is a National Stage Patent Application of PCT International Patent Application No. PCT/KR2019/011417 (filed on Sep. 4, 2019) under 35 U.S.C. § 371, which claims priority to Korean Patent Application Nos. 10-2018-0107105 (filed on Sep. 7, 2018), and 10-2019-0108134 (filed on Sep. 2, 2019), the teachings of which are incorporated herein in their entireties by reference.

TECHNICAL FIELD

The present disclosure relates to methods and devices for performing wireless communication considering the results of performing a listen before talk (LBT) for an unlicensed band in a next-generation wireless access network (hereinafter, "new radio (NR)").

BACKGROUND ART

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra-reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from other (e.g., subcarrier spacing, subframe, Transmission Time Interval (TTI), etc.) as a method for efficiently satisfying each usage scenario requirement through a frequency band constituting any NR system.

As a part of such aspect, it is required to develop a design for performing wireless communication according to a result of performing the LBT on a plurality of subbands constituting an unlicensed band in NR.

DETAILED DESCRIPTION OF THE INVENTION

Technical Problem

According to embodiments, a method and device may be provided for performing efficient band operation in an environment in which LBT success probability for each subband is independent and variable, by sharing availability information based on to a result of performing the LBT on the plurality of the subbands in the unlicensed band.

Technical Solution

In an aspect, according to embodiments, a method may be provided for performing wireless communication by a user equipment (UE) in an unlicensed band. The method may include receiving information for allocating a radio resource in a system band including a plurality of subbands, acquiring availability information based on performing a Listen Before Talk (LBT) on at least one subband comprised in the radio resource, and transmitting the availability information.

In another aspect, according to embodiments, a method may be provided for performing wireless communication by a base station in an unlicensed band. The method may include transmitting information for allocating a radio resource in a system band including a plurality of subbands, and receiving availability information based on performing a Listen Before Talk (LBT) on at least one subband comprised in the radio resource.

In still another aspect, according to embodiments, a UE may be provided for performing wireless communication in an unlicensed band. The UE may include a receiver receiving information for allocating a radio resource in a system band comprising a plurality of subbands, a controller acquiring availability information based on performing a Listen Before Talk (LBT) on at least one subband comprised in the radio resource, and a transmitter transmitting the availability information.

In yet still another aspect, according to embodiments, a base station may be provided for performing wireless communication in an unlicensed band. The base station may include a transmitter transmitting information for allocating a radio resource in a system band including a plurality of subbands, and a receiver receiving availability information based on performing a Listen Before Talk (LBT) on at least one subband comprised in the radio resource.

Advantageous Effects

According to embodiments, band operation may be performed efficiently in an environment in which LBT success probability for each subband is independent and variable, by sharing availability information based on to a result of performing the LBT on the plurality of the subbands in the unlicensed band.

MODE FOR CARRYING OUT THE INVENTION

Figure 1:
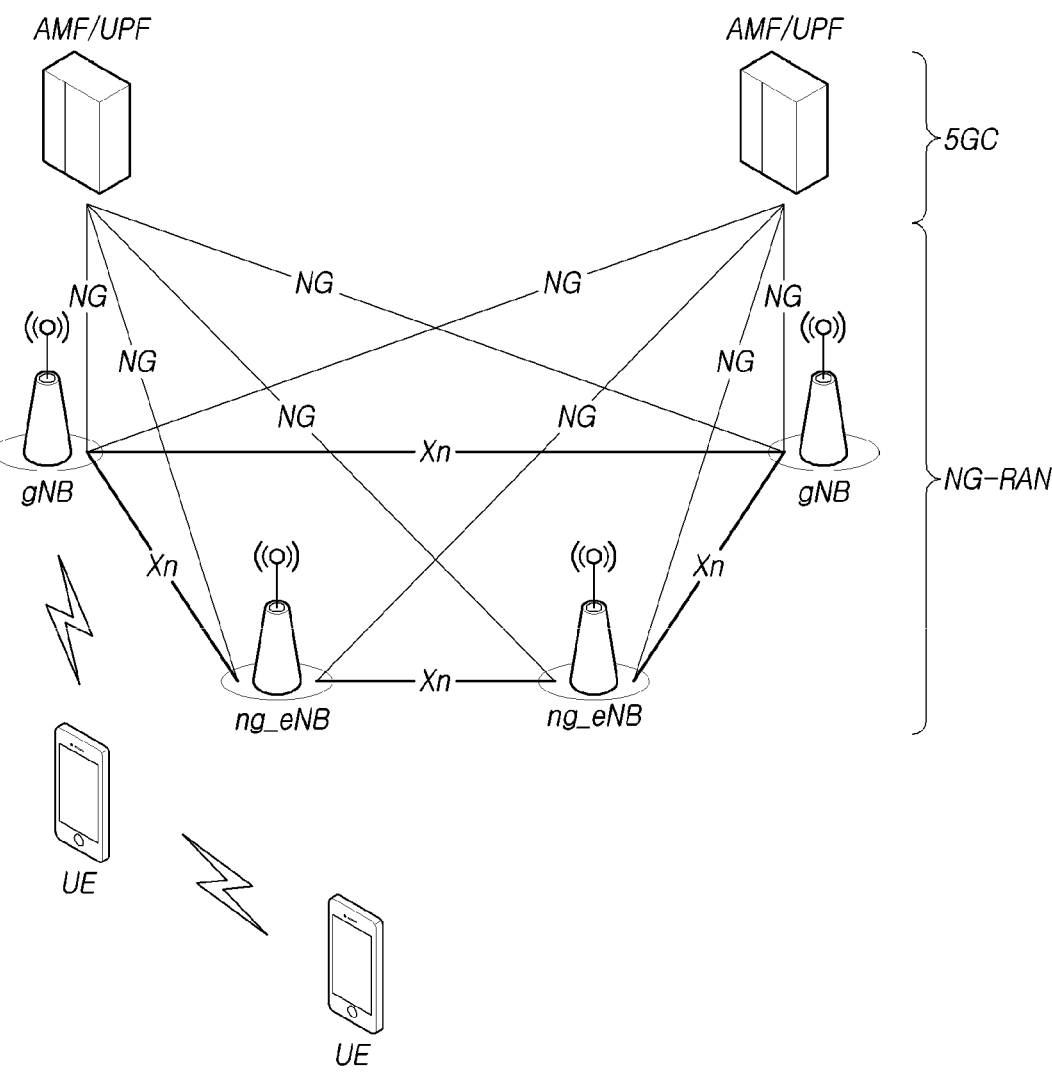
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
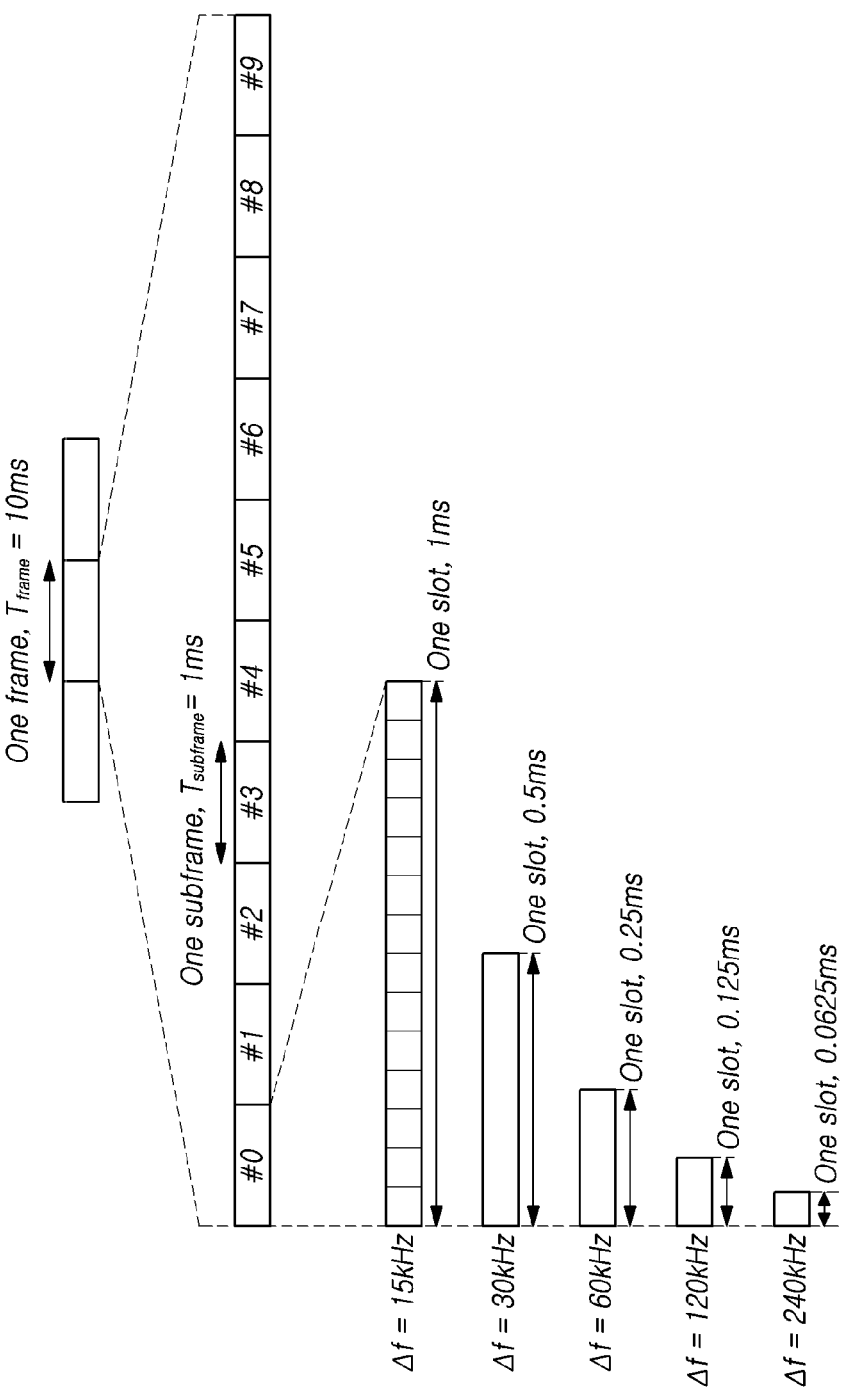
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied. Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-colocation (QC/QCL) relationship. The large-scale properties include at least one of delay spread, Doppler spread, a frequency shift, an average received power, and a received timing.

Figure 3:
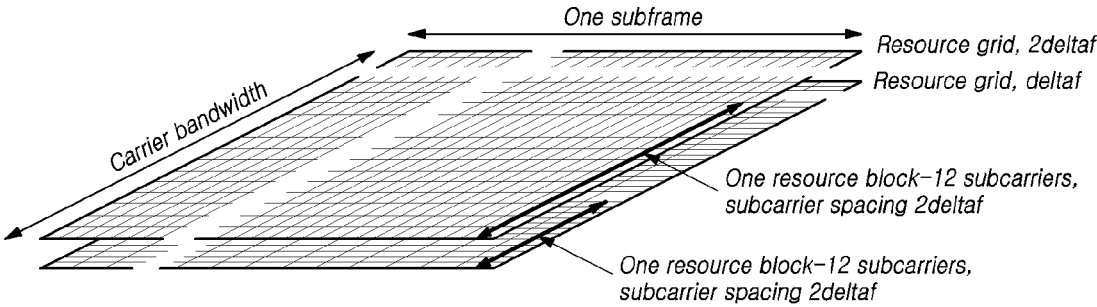
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
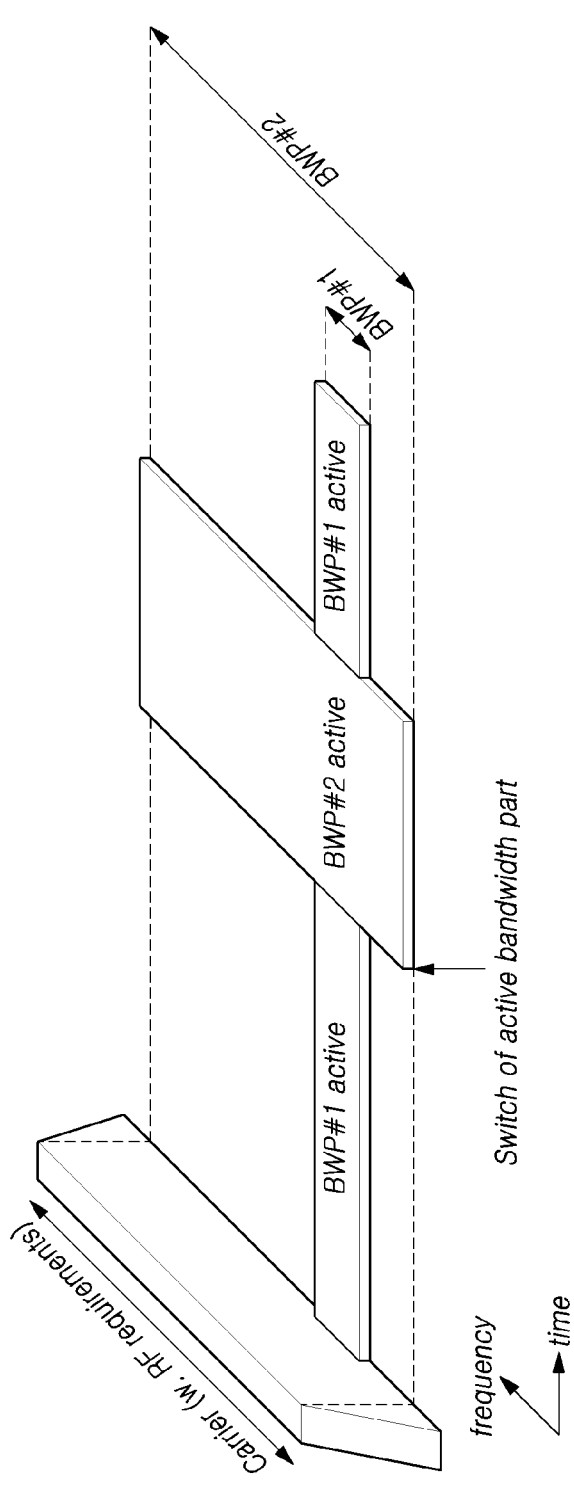
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
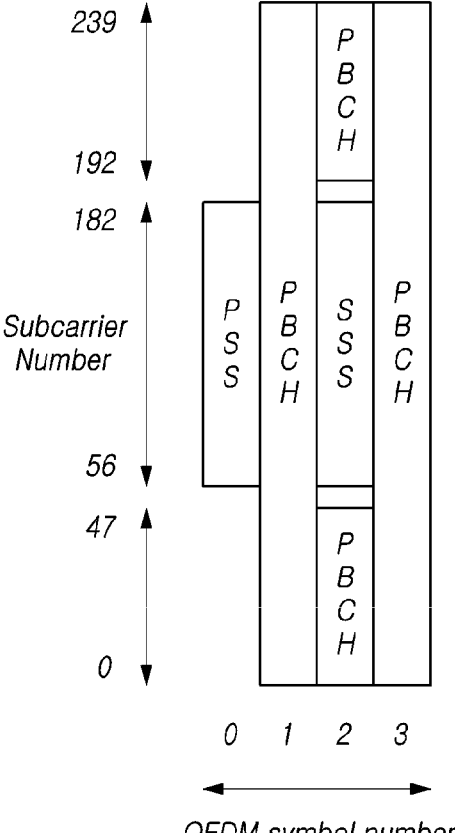
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
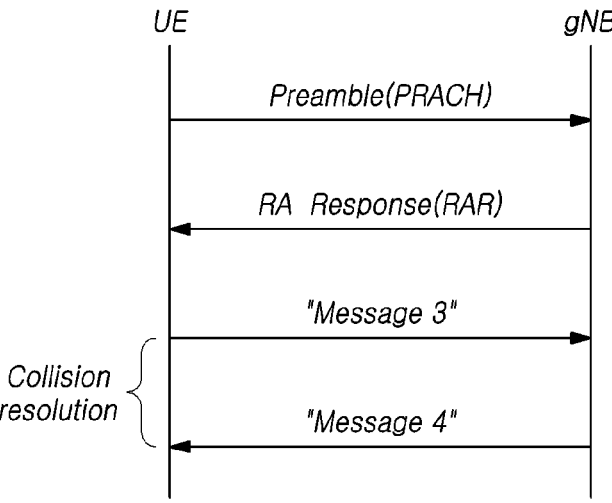
FIG. 6 is a signal diagram for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
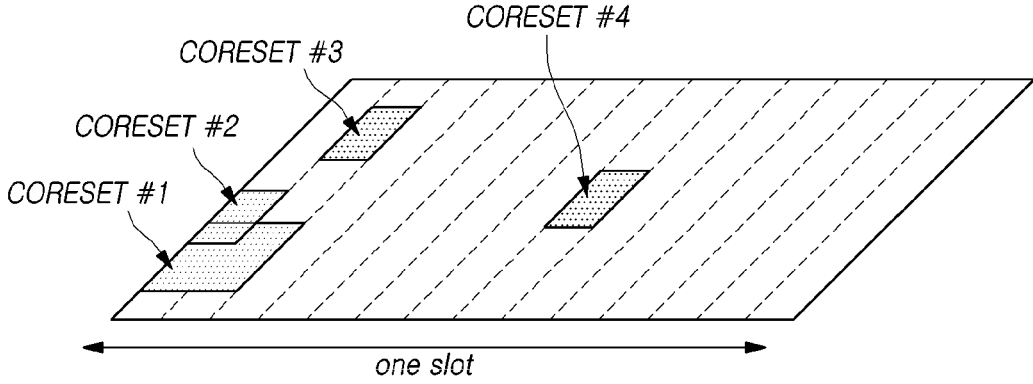
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR (New Radio)

Recently, the 3GPP has approved the "Study on New Radio Access Technology", which is a study item for research on next-generation/5G radio access technology. On the basis of the Study on New Radio Access Technology, discussions have been in progress for frame structures, channel coding and modulation, waveforms, multiple access methods, and the like for the new radio (NR). The NR is required to be designed not only to provide an improved data transmission rate as compared with the LTE/LTE-Advanced, but also to meet various requirements per detailed and specific usage scenario.

An enhanced mobile broadband (eMBB), massive machine-type communication (mMTC), and ultra-reliable and low latency communication (URLLC) are proposed as representative usage scenarios of the NR. In order to meet the requirements per usage scenario, it is required for designing the NR to have flexible frame structures, compared with the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios through a frequency band provided to an NR system.

To this end, there have been discussions on i) methods of multiplexing numerologies having subcarrier spacing (SCS) values different from one another based on TDM, FDM or TDM/FDM through one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms. Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

Figure 8:
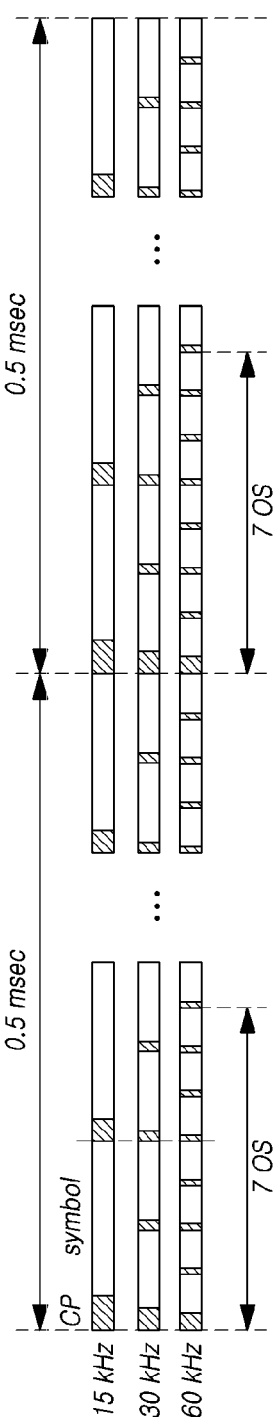
FIG. 8 is a view illustrating an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

Wider Bandwidth Operations

The typical LTE system supports scalable bandwidth operations for any LTC CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 9:
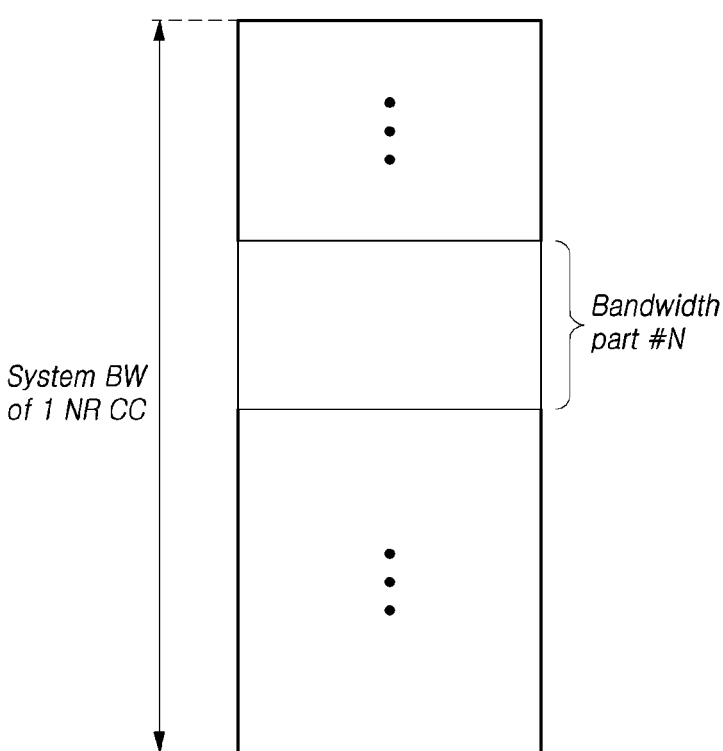
FIG. 9 is a view schematically illustrating a bandwidth part.

However, the NR is designed to be able to support the UE of NR having different transmission/reception bandwidth capabilities through a single wideband NR CC. Accordingly, it is required to configure one or more bandwidth parts (BWPs) including subdivided bandwidths for an NR CC as shown FIG. 9, thereby supporting a flexible and wider bandwidth operation through configuration and activation of different bandwidth parts for respective UEs.

Specifically, one or more bandwidth parts may be configured through a single serving cell configured in terms of a UE in NR, and the UE is defined to activate one downlink (DL) bandwidth part and one uplink (UL) bandwidth part so as to use the same for uplink/downlink data transmission/reception in the corresponding serving cell. In addition, in the case where a plurality of serving cells is configured in the UE (i.e., the UE to which CA is applied), the UE is also defined to activate one downlink bandwidth part and/or one uplink bandwidth part in each serving cell so as to use the same for uplink/downlink data transmission/reception by utilizing radio resources of the corresponding serving cell.

Specifically, an initial bandwidth part for an initial access procedure of a UE may be defined in an serving cell; one or more UE-specific bandwidth parts may be configured for each UE through dedicated RRC signaling, and a default bandwidth part for a fallback operation may be defined for each UE.

It is possible to make a definition such that a plurality of downlink and/or uplink bandwidth parts are simultaneously activated and used according to the capability of the UE and the configuration of the bandwidth parts in an serving cell. However, definition was made in NR rel-15 such that only one downlink (DL) bandwidth part and one uplink (UL) bandwidth part are activated and used in an UE at an time.

NR-U

Unlike licensed bands, unlicensed bands may be used by any provider or person to provide wireless communication services within the regulations of respective countries, instead of being exclusively used by a specific provider. Accordingly, in order to provide NR services using the unlicensed bands, it is required to solve problems caused by co-existence with various short-range wireless communication protocols, such as Wi-Fi, Bluetooth, NFC, or the like, which is provided through unlicensed bands and problems caused by co-existence of NR providers and LTE providers.

Therefore, in order to avoid interference or collision between the respective wireless communication services when providing NR services through the unlicensed band, it is necessary to support an LBT (listen before talk)-based wireless channel access scheme in which a power level of a wireless channel or a carrier to be used is sensed before transmitting a radio signal, thereby determining whether or not the wireless channel or the carrier is available. In this case, if a specific wireless channel or carrier of the unlicensed band is in use by another wireless communication protocol or another provider, the NR services through the corresponding band will be limited, so that the QoS requested by the user may not be guaranteed in the wireless communication services through the unlicensed band, compared to the wireless communication services through the licensed band.

In particular, unlike typical LTE that supports an unlicensed spectrum only through carrier aggregation (CA) with a licensed spectrum, NR-U is based on deployment scenarios in the unlicensed band NR, such as a stand-alone NR-U cell or a dual-connectivity-based NR-U cell with an NR cell or an LTE cell in the licensed band. Thus, it is necessary to design a data transmission/reception method in order to satisfy a minimum QoS in the unlicensed band.

Hereinafter, a method of performing wireless communication using availability information for at least one subband constituting a system band in an unlicensed band will be described with reference to the accompanying drawings.

Figure 10:
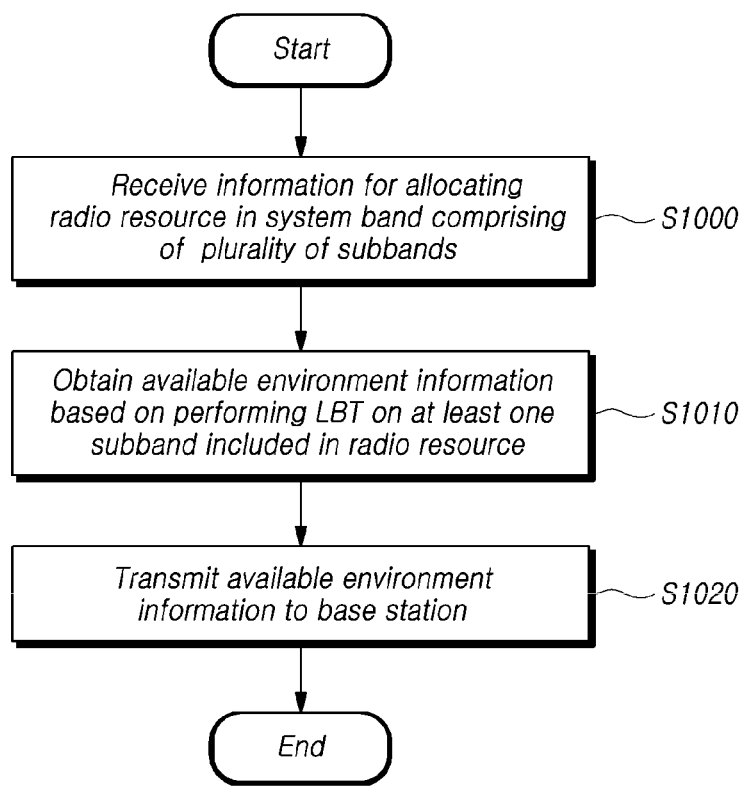
FIG. 10 is a flowchart illustrating a procedure of performing wireless communication using availability information for at least one subband in an unlicensed band by a UE according to an embodiment.

FIG. 10 is a flowchart illustrating a procedure of performing wireless communication using availability information for at least one subband in an unlicensed band by a UE according to an embodiment.

Referring to FIG. 10, the UE may receive information for allocating a radio resource in a system band made up of a plurality of subbands at S1000.

In the embodiment, it is assumed that the system band in the unlicensed band is made up of the plurality of the subbands corresponding to 20 MHz, which is an LBT performance unit. For example, the system band of 100 MHz may be made up of five subbands. At least one of the plurality of the subbands may be configured as a bandwidth part (BWP) of the UE.

The base station may allocate the radio resource for the UE to receive the downlink data or to transmit the uplink data to the bandwidth part of the UE. The UE may receive allocation information for a resource block (RB) or allocation information for the subband constituting the bandwidth part in the frequency domain. Alternatively, the UE may receive allocation information for a transmission start symbol and duration in the time domain. According to an example, the allocation information for the radio resource may be indicated through the downlink control information (DCI).

Referring back to FIG. 10, the UE may obtain availability information based on performing a Listen Before Talk (LBT) on at least one subband included in the radio resource at S1010.

According to an embodiment, the UE may perform the LBT on each of at least one subband included in the allocated radio resource. The UE may obtain the availability information based on the LBT result for the subband. Here, the availability information may be referred to information indicating whether a corresponding subband is available or not. However, it is only for convenience of description, and embodiments are not limited thereto. In the present disclosure, the availability information may be referred to as band availability information or the like.

According to an embodiment, the availability information may be determined based on the number of successes and the number of failures in the LBT for each of the at least one subband. For example, the UE may acquire values such as the number of failures versus one success in the LBT for a specific subband, the number of successes versus one failure of the LBT, or an LBT success ratio displayed in the form of an index as the availability information.

Referring back to FIG. 10, the UE may transmit the availability information to the base station at S1020.

The UE may independently transmit the availability information for each subband. Alternatively, the UE may combine and transmit state information for all subbands related to data transmission. For example, indexes for the subbands with the best channel availability situations may be delivered. Alternatively, the average value of all subbands or subband groups in the currently active bandwidth part (BWP) may be delivered.

According to an embodiment, the UE may explicitly transmit the availability information by including it in the uplink control information. For example, the availability information may be transmitted by being included in uplink control information (UCI) for channel state information feedback and transmitted. Alternatively, the availability information may be transmitted through an independent PUCCH channel by performing channel information feedback based on a subband corresponding to the LBT performance unit. In this case, like the typical CSI, the UE may perform the channel information feedback when requested, or the UE may perform the channel information feedback according to a predetermined period.

According to another embodiment, the UE may explicitly transmit the availability information through the sounding reference signal (SRS). If the base station allocates the radio resource to transmit the SRS, the UE may perform the LBT when transmitting the SRS. If the LBT for the allocated resource fails, the UE may modify a SRS by reflecting the number of failures in the previously performed LBT and transmit the modified SRS at the next SRS transmission.

To this end, the SRS modification method may be previously configured in cooperation with the base station. According to an embodiment, the SRS modification method may be a mutually agreed interleaving operation, such as a change of an SRS generation parameter, a symbol phase shift, or a cyclic shift. For example, if k consecutive LBT failures occur when attempting SRS transmission, the UE may perform cyclic-shift on the SRS by k and transmit it (e.g., modified SRS).

According to another embodiment, the availability information may be explicitly delivered through an RRC message of the UE. For example, a channel busy ratio (CBR) may be calculated based on the LBT failure frequency in each subband in the uplink BWP, and this may be transmitted through a CBR reporting RRC message. The base station may obtain channel availability status information for each uplink subband of a corresponding user through the CBR reporting RRC message.

According to another embodiment, the availability information may be implicitly transmitted according to transmission of the uplink data by the UE. The LBT failure frequency in each subband in the uplink BWP may be expressed as the frequency at which transmission is performed in the allocated resource region. Thus, the base station may indirectly obtain the related information by counting the successfully received transmission.

However, in this case, the transmission failure due to the LBT failure is only reflected but transmission failure due to a channel error is not reflected. Accordingly, in order to consider the transmission failure due to the channel error, etc., a plurality of radio resource regions may be allocated in the form of multiple resources for transmission of the uplink data. The plurality of radio resources may be divided and allocated to different time/frequency bands, or different base sequences, messages using different formats, and different spreading/scrambling codes may be applied. When the LBT failure occurs, the UE may transmit the uplink data by selecting another resource from among the plurality of the allocated radio resources according to a predetermined situation.

The base station may check which region of the allocated radio resource regions is used to transmit the uplink data. Accordingly, the base station may determine the availability information for the corresponding band uplink channel. For example, if n resource regions are allocated in advance in the time axis and transmission is actually performed in the k-th resource region, the base station may know that k−1 LBT failures have been made, and the LBT success rate is approximately 1/k.

The base station may allocate the radio resource for transmission and reception of the downlink data or the uplink data based on the received availability information.

According to an embodiment, the plurality of the radio resources may be allocated to transmission and reception of predetermined data based on the availability information. The UE may receive the downlink control information (DCI) including information on the plurality of the radio resources. For example, the predetermined data may be an essential transmission control message such as a Synchronization Signal Block (SSB) or a paging message.

The base station may configure a plurality of candidate transmission regions to be used instead when transmission is not possible at an allocated time in relation to transmission of a control message transmitted through the downlink based on the bandwidth availability information for each of the downlink subbands. In this case, the base station may configure more candidate transmission regions if the bandwidth availability is bad. The UE may receive, from the base station, information on a candidate transmission region to attempt additional detection when message detection fails. Accordingly, it is possible to increase the success rate of receiving the essential control message.

Alternatively, the base station may allocate the plurality of the radio resources for transmitting predetermined information in the uplink based on the band availability information for each subband. Accordingly, the UE is given a plurality of opportunities to transmit the same information in the time domain, and the UE may perform transmission without additional control feedback even when the LBT failure occurs.

In this case, as the number of candidates to be allocated increases, the transmission success rate increases. However, resource efficiency decreases because resources for other purposes are not allocated to each candidate transmission region. Accordingly, the base station may adjust the number of candidate transmission regions for each subband based on the received band availability information for each subband.

According to an embodiment, the base station may select a specific subband from at least one of subbands included in the radio resource based on the availability information. The UE may receive the downlink control information (DCI) including information indicating the selected subband. For example, messages having a large difference between an allocation time and an actual use time in an uplink environment, such as a CSI feedback control message, are affected by a variable band availability environment over time. In the case of control messages that do not need to be transmitted depending on the band, it is advantageous for transmission to select a subband having a good available environment.

Accordingly, the base station may allocate the plurality of the transmission regions for corresponding control messages for each subband in advance. The UE may receive information indicating a subband to be actually used at a specific time in the form of an index or the like. Through this, the UE may determine the subband to be used at the time point.

In order to change the subband, the UE may attempt to detect a change control message when the situation of the subband currently being used deteriorates beyond a threshold value. In this case, the base station should perform the indication only when a channel situation deteriorated beyond the threshold value is received. Alternatively, the UE may be configured to always attempt to detect the change control message. Alternatively, it may be configured to include a corresponding message in the periodically transmitted DCI.

Accordingly, by sharing availability information based on the LBT performance results for the plurality of the subbands in the unlicensed band, band operation may be efficiently performed in an environment in which the LBT success probability for each subband is independent and variable.

Figure 11:
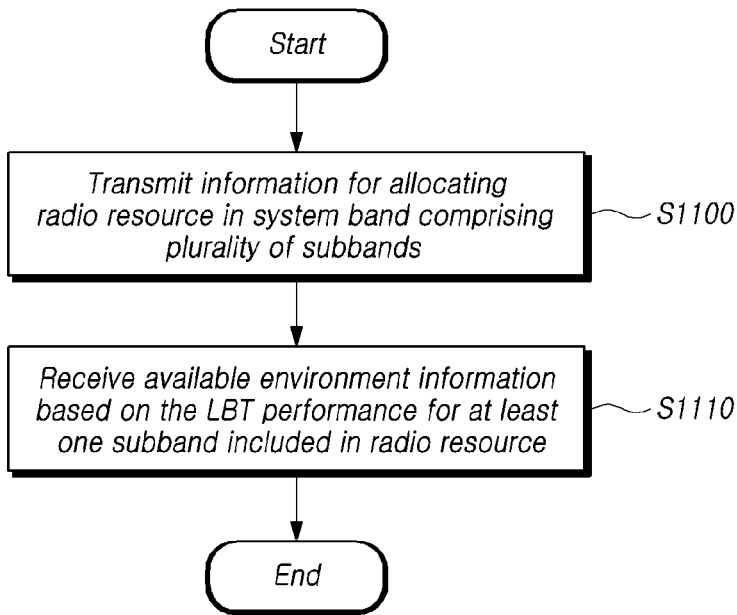
FIG. 11 is a flowchart illustrating a procedure of performing wireless communication using availability information for at least one subband in an unlicensed band by a base station according to an embodiment.

FIG. 11 is a flowchart illustrating a procedure of performing wireless communication using availability information of at least one subband in an unlicensed band by a base station according to an embodiment.

Referring to FIG. 11, the base station may transmit information for allocating a radio resource in a system band made up of a plurality of subbands at S1100.

The base station may allocate the radio resource for the UE to receive the downlink data or to transmit the uplink data to the bandwidth part of the UE. The base station may transmit allocation information for a resource block (RB) or allocation information for the subband constituting the bandwidth part in the frequency domain. Alternatively, the base station may transmit allocation information for a transmission start symbol and duration in the time domain. According to an embodiment, the allocation information for the radio resource may be indicated through the downlink control information (DCI).

Referring back to FIG. 11, the base station may receive availability information based on the LBT performance for at least one of subbands included in the radio resource at S1110.

According to an embodiment, the UE may perform the LBT on each of at least one subband included in the allocated radio resource. The UE may obtain the availability information based on the LBT result for the subband. The availability information may be determined based on the number of successes and the number of failures of the LBT for each of the at least one subband. For example, the UE may acquire values such as the number of failures versus one success of the LBT for a specific subband, the number of successes versus one failure of the LBT, or an LBT success ratio displayed in the form of an index as the availability information.

According to an embodiment, the base station may receive the availability information included in the uplink control information. For example, the availability information may be included in UCI for channel state information feedback. Alternatively, the base station may receive the availability information through an independent PUCCH channel by performing channel information feedback based on a subband corresponding to the LBT performance unit.

According to another embodiment, the base station may receive the availability information through the sounding reference signal (SRS). If the base station allocates the radio resource to transmit the SRS, the UE may perform the LBT when transmitting the SRS. If the LBT for the allocated resource fails, the UE may modify a SRS by reflecting the number of failures in the previous LBT performed for the previous SRS transmission and transmit the modified SRS at the next SRS transmission time.

To this end, the SRS modification method may be previously configured in cooperation with the base station. According to an embodiment, the SRS modification method may be a mutually agreed interleaving operation, such as a change of an SRS generation parameter, a symbol phase shift, or a cyclic shift. For example, if k consecutive LBT failures occur when attempting to transmit the SRS, the base station may receive the modified SRS which is cyclic-shifted by k.

According to another embodiment, the availability information may be implicitly transmitted according to transmission of the uplink data by the UE. The LBT failure frequency in each subband in the uplink BWP may be expressed as the frequency at which transmission is performed in the allocated resource region. Thus, the base station may indirectly obtain the related information by counting the successfully received transmission.

However, in this case, transmission failure due to a channel error other than the transmission failure due to the LBT failure is not reflected. Accordingly, in order to consider the transmission failure due to the channel error, etc., a plurality of radio resource regions may be allocated in the form of multiple resources for transmission of the uplink data. The plurality of radio resources may be divided and allocated to different time/frequency bands, or different base sequences, messages using different formats, and different spreading/scrambling codes may be applied. When the LBT failure occurs, the UE may transmit the uplink data by selecting another resource from among the plurality of the allocated radio resources according to a predetermined situation.

The base station may check which region of the allocated radio resource regions is used to transmit the uplink data. Accordingly, the base station may determine the availability information for the corresponding band uplink channel. For example, if n resource regions are allocated in advance in the time axis and transmission is actually performed in the k-th resource region, the base station may be aware of that k−1 LBT failures have been made, and the LBT success rate is approximately 1/k.

The base station may allocate the radio resource for transmission and reception of the downlink or the uplink data based on the received availability information.

According to an embodiment, the plurality of the radio resources may be allocated for transmission and reception of predetermined data based on the availability information. The UE may receive the downlink control information (DCI) including information on the plurality of the radio resources. For example, the predetermined data may be an essential transmission control message such as a Synchronization Signal Block (SSB) or a paging message.

The base station may configure a plurality of candidate transmission regions to be used instead when transmission is not possible at an allocated time in relation to transmission of a control message transmitted through the downlink based on the band availability information for each of the downlink subbands. In this case, the base station may configure more candidate transmission regions when the band availability is bad. The base station may transmit information on a candidate transmission region to attempt additional detection when message detection fails to the UE. Accordingly, it is possible to increase the success rate of receiving the essential control message.

Alternatively, the base station may allocate the plurality of the radio resources for transmitting predetermined information in the uplink based on the band availability information for each subband. Accordingly, the UE is given a plurality of opportunities to transmit the same information in the time domain, and the UE may perform transmission without additional control feedback even when the LBT failure occurs.

In this case, as the number of candidates to be allocated increases, the transmission success rate increases. However, resource efficiency decreases because resources for other purposes are not allocated to each candidate transmission region. Accordingly, the base station may adjust the number of candidate transmission regions for each subband based on the received band availability information for each subband.

According to an embodiment, the base station may select a specific subband from at least one subband included in the radio resource based on the availability information. The UE may receive the downlink control information (DCI) including information indicating the selected subband. For example, messages having a large difference between an allocation time and an actual use time in an uplink environment, such as a CSI feedback control message, are affected by a variable bandwidth available environment over time. In the case of control messages that do not need to be transmitted depending on the band, it is advantageous for transmission to select a subband having a good available environment.

Accordingly, the base station may allocate the plurality of the transmission regions for corresponding control messages for each subband in advance. The UE may receive information indicating a subband to be actually used at a specific time in the form of an index or the like. Through this, the UE may determine the subband to be used at the time point.

In order to change the subband, the UE may attempt to detect a change control message when the state of the currently using subband deteriorates beyond a threshold value. In this case, the base station should transmit the indication only when a channel state deteriorated beyond the threshold value is received. Alternatively, the UE may be configured to always attempt to detect the change control message. Alternatively, it may be configured to include a corresponding message in the periodically transmitted DCI.

Accordingly, by sharing availability information based on the LBT performance results for the plurality of the subbands in the unlicensed band, band operation may be efficiently performed in an environment in which the LBT success probability for each subband is independent and variable.

Hereinafter, each embodiment of performing the wireless communication using the availability information on the subband in the NR unlicensed band will be described in detail with reference to the related drawings.

As described above, in order to transmit the radio signal from a node in the unlicensed band, a listen before talk (LBT) process must be performed to check whether a corresponding radio channel is occupied by another node.

Accordingly, in order to transmit the PDSCH for a UE in the NR-U cell of the unlicensed band configured by a NR base station, the base station must perform the LBT for the unlicensed band. As a result of performing the LBT, when the radio channel of the corresponding unlicensed band is empty, the base station may transmit the PDCCH and the PDSCH according thereto to the UE.

Similarly, in order to transmit the uplink signal in the unlicensed band in the UE, it is required to perform the LBT on the unlicensed band before transmitting the uplink signal.

Figure 12:
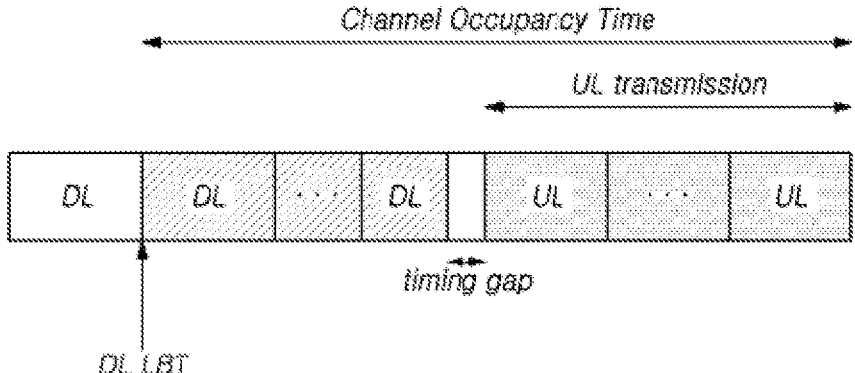
FIG. 12 is a view illustrating an example of performing an LBT for wireless communication in an unlicensed band according to an embodiment.

FIG. 12 is a view illustrating an example of performing an LBT for wireless communication in an unlicensed band according to an embodiment.

As an example, it may be defined that, upon PUCCH transmission resource allocation for a UE or upon PUSCH transmission resource allocation, it is indicated by the base station whether to perform an LBT in the corresponding UE. The UE may transmit uplink control information (UCI), e.g., HARQ ACK/NACK feedback information or CQI/CSI reporting information, to the base station via the PUCCH. In relation thereto, in NR, the time resource and frequency resource, which is the PUCCH resource for transmission of the HARQ feedback, may be indicated by the base station via downlink allocation DCI (DL allocation DCI). Or, the PUCCH resource for transmitting the HARQ feedback may be semi-statically configured via RRC signaling. In particular, in the case of time resource, the timing gap between the PDSCH reception slot and its corresponding HARQ feedback information transmission slot may be transmitted to the UE via downlink allocation DCI or RRC signaling.

Even in the case of the PUCCH resource for CQI/CSI reporting, it may be likewise allocated via RRC signaling and downlink allocation DCI.

In FIG. 12, the shading blocks depict that the LBT (DL LBT) for downlink transmission in the base station succeeds so that downlink transmission in the subsequent time is performed via an unlicensed band. As an example, downlink transmission may be transmission of a downlink channel or signal indicating uplink transmission. For example, the downlink transmission may be PDSCH and its resultant PUCCH for HARQ feedback, the DCI requiring CQI/CSI reporting, and PUCCH for its resultant reporting, or DCI transmitting scheduling information for PUSCH and its resultant PUSCH. In this case, a timing gap occurs between the downlink transmission and the uplink transmission.

For example, where the downlink signal or channel according to downlink transmission indicates PUCCH transmission in the NR-U cell which is the unlicensed band, the UE is basically required to first perform the LBT for the PUCCH transmission according to the regulation of the unlicensed spectrum, and whether to transmit the PUCCH is determined at the time indicated according to the result of the LBT. If the corresponding radio channel is occupied by another node as a result of the LBT, i.e., when an LBT failure occurs, the UE may fail to transmit the PUCCH at the indicated time.

However, where the downlink allocation DCI transmission slot including PUCCH resource allocation information and PUCCH transmission indication information or PDSCH transmission slot according to the corresponding downlink allocation DCI, and its resultant PUCCH transmission slot belong to the channel occupancy time (COT) of the base station, the corresponding UE may transmit the PUCCH without performing an LBT. This is why the base station already occupies for downlink transmission for the corresponding UE in the corresponding unlicensed band. Thus, it is not in the state of being occupied by another node. In other words, it may be possible to perform HARQ feedback transmission via the PUCCH without an LBT in the corresponding UE depending on the timing gap and the base station's COT.

Likewise, where CSI/CQI reporting via the PUCCH is indicated via the downlink allocation DCI, it may be possible to report CSI/CQI via the PUCCH without an LBT in the corresponding UE depending on the COT of the base station and the timing gap between the slot of transmitting the corresponding downlink allocation DCI and its resultant slot of performing PUCCH transmission including CQI/CSI reporting information.

Further, like in the case where of the PUCCH, even for PUSCH transmission by the UE, the timing gap information between the uplink grant DCI transmitted by the base station and the slot in which its resultant PUSCH transmission is performed may also be configured semi-statically via RRC signaling by the base station or dynamically via uplink grant DCI. Even in such a case, if the uplink grant DCI transmission slot including the corresponding PUSCH transmission resource allocation information and its resultant PUSCH transmission slot fall within the channel occupancy time (COT) of the base station, the UE may perform PUSCH transmission without performing an LBT.

In relation thereto, according to an embodiment of the disclosure, the base station may configure an LBT scheme of performing an LBT upon PUCCH or PUSCH transmission in a UE and indicate the same to the UE. As an example, the LBT scheme may be divided into a plurality of schemes by at least one of whether to perform an LBT, whether to perform a random backoff, and the random backoff time. In the disclosure, the scheme of performing an LBT is denoted an 'LBT scheme,' but is not limited thereto. The scheme of performing an LBT may be denoted, e.g., an LBT category, or in other various manners.

As an example, the LBT scheme may include, e.g., i) a first LBT scheme in which no LBT is performed, ii) a second LBT scheme in which an LBT is performed but no random backoff is performed, iii) a third LBT scheme in which an LBT and a random backoff are performed but the random backoff time interval is fixed, and iv) a fourth LBT scheme in which an LBT and a random backoff are performed but the random backoff time interval is varied.

As an example, the base station directly may indicate whether to perform an LBT for uplink transmission of the UE via L1 control signaling. Specifically, it may be defined to include corresponding LBT indication information in the downlink allocation DCI format for transmitting PDSCH scheduling control information.

For example, the corresponding LBT indication information may be one-bit indication information. In this case, it may be defined that upon PUCCH transmission by the UE, corresponding to the corresponding downlink allocation DCI format according to the corresponding bit value (0, 1), it is determined whether to perform an LBT in the corresponding UE. In other words, in this case, the value of the corresponding bit may mean differentiating the first LBT scheme from the other LBT schemes among the above-described LBT schemes.

As another embodiment, the corresponding LBT indication information may be two-bit indication information. In this case, the LBT indication information may be defined to determine the LBT scheme for performing an LBT in the corresponding UE upon PUCCH transmission by the UE, corresponding to the corresponding downlink allocation DCI format according to the corresponding bit value (00, 01, 10, 11). In other words, in this case, the value of the corresponding bit may mean differentiating the first LBT scheme to the fourth LBT scheme among the above-described LBT schemes.

In this case, the UE's PUCCH transmission corresponding to the above-described downlink allocation DCI format may be PUCCH transmission for the UE's HARQ feedback information transmission according to the reception of the UE's PDSCH based on the corresponding downlink allocation DCI format. Or, another case of the UE's PUCCH transmission corresponding to the downlink allocation DCI format may be PUCCH transmission for CQI/CSI reporting when CQI/CSI reporting is triggered by the corresponding downlink allocation DCI format.

Likewise, it may be defined to include corresponding LBT indication information in the uplink grant DCI format for transmitting PUSCH scheduling control information.

For example, the corresponding LBT indication information may be one-bit indication information. In this case, the LBT indication information may be defined to indicate whether to perform an LBT in the corresponding UE, upon PUSCH transmission by the UE, corresponding to the corresponding uplink grant DCI format according to the corresponding bit value (0, 1). In other words, in this case, the value of the corresponding bit may mean differentiating the first scheme from the other schemes among the above-described LBT schemes.

As another embodiment, the corresponding LBT indication information may be two-bit indication information. In this case, the LBT indication information may be defined to determine the LBT scheme for performing an LBT in the corresponding UE, upon PUSCH transmission by the UE, corresponding to the corresponding uplink grant DCI format according to the corresponding bit value (00, 01, 10, 11). In other words, in this case, the value of the corresponding bit may mean differentiating the first scheme to the fourth scheme among the above-described LBT schemes.

However, the UE's PUSCH transmission corresponding to the uplink grant DCI format may be PUSCH transmission for the UE's UCI transmission or PUSCH transmission for the UE's uplink data transmission.

As another embodiment for defining an LBT scheme or whether to perform an LBT for uplink transmission in the UE, whether to perform an LBT may be defined to be determined by the timing gap between i) the downlink transmission where the corresponding uplink transmission is indicated and ii) its resultant uplink transmission as shown in FIG. 12.

As an example, where the timing gap is smaller than a threshold, it may be defined to enable the indicated PUCCH or PUSCH transmission without an LBT in the corresponding UE. It may be also defined that, when the timing gap is larger than the corresponding threshold, the UE performs an LBT. Then, PUCCH or PUSCH transmission is enabled accordingly.

As an example, the corresponding threshold may be determined based on the COT value in the corresponding NR-U, or accordingly set via cell-specific RRC signaling or UE-specific RRC signaling by the base station or, regardless of the COT, set by the base station via cell-specific RRC signaling or UE-specific RRC signaling.

Additionally, the corresponding threshold may be defined as a single threshold or as different thresholds per uplink transmission case and may thus be set by the base station via cell-specific RRC signaling or UE-specific RRC signaling.

According to the embodiments shown above, an LBT scheme to be performed to transmit an uplink signal in an unlicensed band may be determined, and an uplink signal may be transmitted in the unlicensed band according to the determined LBT scheme.

Hereinafter, a method for controlling a transmission mechanism when a channel available situation is independent of the intention of a transmitter/receiver in the 3GPP NR system according to embodiments of the present disclosure will be described in detail. In particular, a method of configuring a transmission mechanism according to the availability of a channel in an NR-based access to unlicensed spectrum (NR-U) system environment using a common channel as a transmission space will be described in detail.

In the typical 3GPP LTE, the license-assisted access (LAA) system was proposed as one method of using a unlicensed band. The LAA system operates a control channel through a license band and operates a data channel through the unlicensed band. In addition, studies are underway to introduce the NR-U system to transmit.

As described above, for the unlicensed band, after checking whether there is another device occupying the channel band to be transmitted through the LBT (Listen-Before-Talk) process in general, communication may be initiated only when the corresponding channel band is not occupied. That is, the communication is initiated only when there is no other device performing the wireless communication in the corresponding band. In this case, since it is inefficient to perform the LBT process for all frequency components, in general, the occupancy status in the corresponding band is examined in units of 20 MHz and it is determined whether the communication is possible in the corresponding band.

For the NR system, scenarios of using a band larger than 20 MHz as an LBT unit are considered. Accordingly, there are discussions for developing operation methods in the band of 20 MHz or more in the NR-U. In this case, there are a plurality of LBT intervals divided by a 20 MHz unit, and each of the plurality of LBT intervals may be divided into subbands within one band.

In the unlicensed band, the occupancy status of the corresponding band varies depending on the presence or absence of other communication equipment within the range of the radio signal and whether the corresponding equipment is activated. When many devices perform the communication in an active band, it is inevitably difficult to secure communication resources in the corresponding band. Therefore, in a system that secures a plurality of subbands as an available communication area, it is advantageous to perform the communication while avoiding a band in which relatively many devices are activated.

As described above, in a system in which a plurality of subbands are secured as the available communication area, it is advantageous to preferentially perform resource allocation to the subband with the lowest failure probability by estimating the LBT failure probability of each band. In a downlink environment, since resource regions are allocated by themselves, a band with frequent LBT failures may be directly determined and placed as a lower priority in scheduling. However, in an uplink environment, since the receiving end may not know a band in which the LBT failure is frequent at the transmitting end, a problem may arise that the resource allocated by the base station as the receiving end may be a band in which the LBT failure is frequent. In addition, even when the difference between the resource allocation timing and the usage timing such as semi-persistent scheduling (SPS) or paging is large, an environment that changes according to the situation may not be properly applied.

Hereinafter, the present disclosure provides an efficient band operation method in an environment in which transmission is performed over the plurality of the subbands in an NR-U environment, and the LBT success/failure probability of each subband is independent and variable. To this end, a method of sharing information related to channel occupancy status for efficient band operation and a method of band operation in periodic resource allocation and paging operation based on the information are introduced.

The present disclosure provides a method of transmitting information related to an available band environment, a method of operating a control message for each provided band available environment, and a method of reconfiguring resources for each provided band available environment. Terms used in the present disclosure may be replaced with other terms having substantially the same meaning later, and are for convenience of description, and the scope of the technology is not limited by the terms used.

Figure 13:
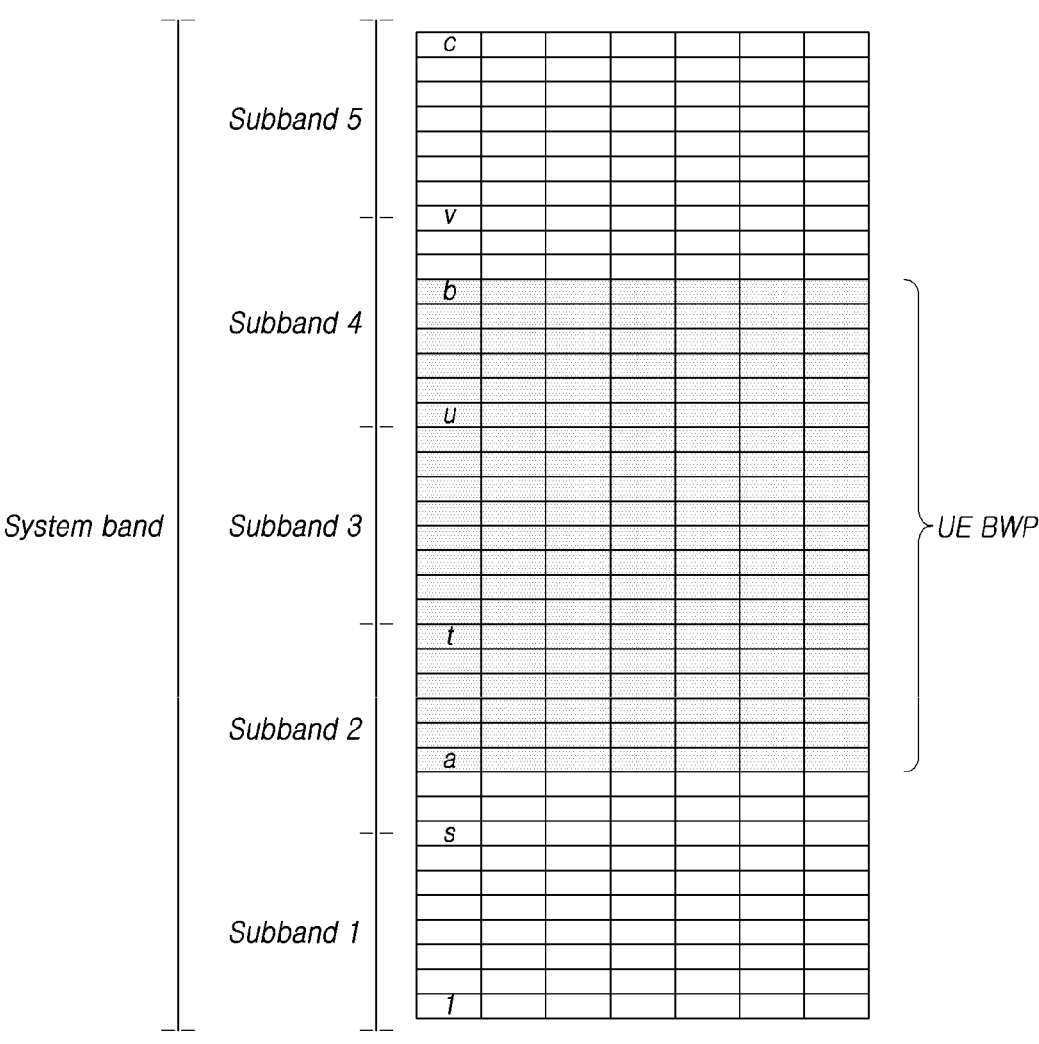
FIG. 13 is a view illustrating a subband of an unlicensed band according to an embodiment.
Figure 14:
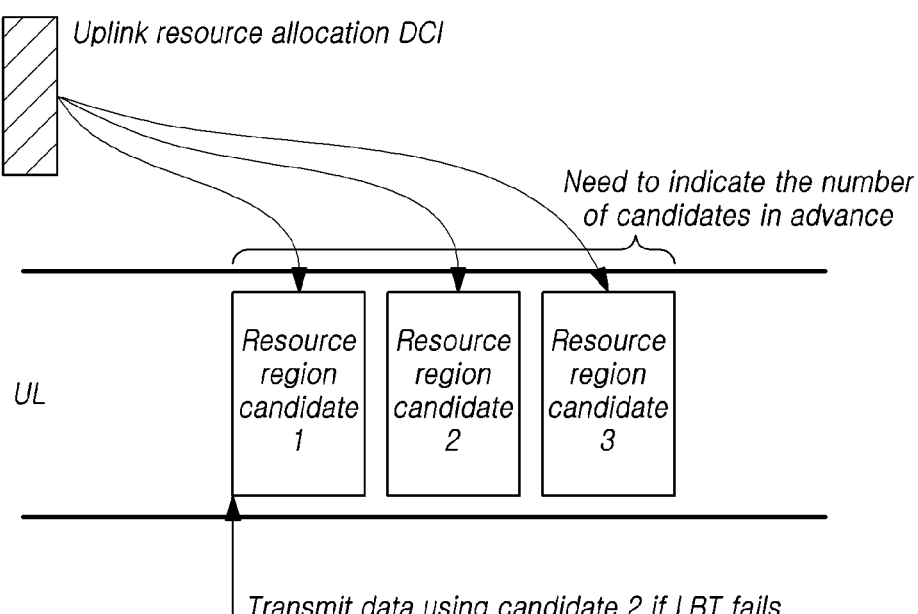
FIG. 14 is a view for explaining allocating a plurality of radio resources for transmitting and receiving predetermined data based on availability information according to an embodiment.

FIG. 13 is a view illustrating a subband of an unlicensed band according to an embodiment. FIG. 14 is a view for explaining allocating a plurality of radio resources for transmitting and receiving predetermined data based on availability information according to an embodiment.

As shown in FIG. 13, it is assumed that the system band made up of a plurality of subbands, which are LBT performance units. For example, the system band of 100 MHz made up of five subbands may be assumed. It is assumed that the corresponding band is composed of c resource blocks (RBs) represented by numbers from 1 to c, and that the bands from a to b are composed of a bandwidth part (BWP) of the UE. In addition, it is assumed that the number of RBs in which the divisions dividing each subband exist are s, t, u, and v, respectively. In this case, as shown in FIG. 13, it is assumed that a relationship of $1 < s \le a < t < u < b \le v < c$ is established. In FIG. 13, values of s and a, b and v are all illustrated as different cases, but this is an example and is not limited thereto. Each value of s and a, and b and v may have an equal sign relationship.

FIG. 13 shows that the number of OFDM symbol units is 7, as an example, and the method provided in the present disclosure may be applied regardless of values such as the number of RBs or slot lengths constituting each subband. The configuration of the system band and the subband shown in FIG. 13 and the configuration of the BWP of the UE are examples for convenience of description, and are not limited thereto. It is natural that the number of RBs in the system band, the number of the subbands, the number of configured RBs, or the BWP of the UE may be configured differently depending on the case.

Each of the embodiments described below may be implemented independently or in various combinations of the respective embodiments.

First Embodiment: Method of Delivering Information Related to Available Band

According to an embodiment, the UE may transmit, to the base station, information on available bands through LBT performance of the subbands allocated or likely to be allocated. Hereinafter, a method of transmitting the band availability information will be explained in view of both a physical layer and a higher layer, respectively. In addition, the explanation is divided into methods of explicitly and implicitly delivering the availability information. These methods are mutually independent and may be selectively applied as needed.

According to an embodiment, the information transmitted as the value of the band availability information may be a value, such as the number of failures versus one success of the LBT of a specific subband, the number of successes versus one failure of the LBT, or an LBT success rate displayed in the form of an index. According to an embodiment, status information for one subband may be independently transmitted, or status information for all subbands related to the data transmission may be transmitted in a combined form. For example, the state information may be delivered as indexes of subbands with the best channel availability situations according to LBT attempts, or as the average value of all subbands or subband groups in the current bandwidth part (BWP).

According to an embodiment, the band availability information may be explicitly transmitted through the physical layer. For example of using the physical layer, the band availability information may be transmitted through uplink control information (UCI) or a reference signal (RS). For example, the band availability information may be included in the UCI for channel state information feedback (CSI feedback) and transmitted. Alternatively, the band availability information may be transmitted through an independent PUCCH channel by performing channel information feedback based on a subband corresponding to the LBT performance unit, similar to the CSI feedback. In this case, like the typical CSI, it may be fed back upon request or may be periodically fed back.

In case of using the RS, the band availability information may be transmitted through the sounding reference signal (SRS) transmitted periodically or when necessary. For example, when a periodically transmitted SRS is configured, the UE allocates a physical resource location to transmit the SRS. Then, the UE may perform the LBT when transmitting the SRS. If the LBT fails, the UE should not transmit the SRS to the corresponding resource. In this case, the UE may modify a SRS by reflecting the number of failures in the previously performed LBT and transmit the modified SRS at a next SRS transmission.

In this case, the SRS modification must be sufficiently predictable by the base station from the past SRS detection history, etc., and may be a mutually agreed interleaving operation, such as a change of an SRS generation parameter, a symbol phase shift, or a cyclic shift. For example, if k consecutive LBT failures occur when attempting to transmit the SRS, the UE may perform a cyclic-shift operation on the SRS by k and transmit the k cyclic-shifted SRS as the modified SRS.

According to another embodiment, the band availability information may be implicitly delivered through the physical layer. The LBT failure frequency in each subband in the uplink BWP may be effectively expressed as how often the actual transmission is performed in the corresponding resource at the time requested by the base station. Therefore, it is possible to obtain related information indirectly by counting the successfully received transmission.

However, this method does not consider the probability of transmission failure due to a channel error. Therefore, it is necessary to have a separate method for detecting the transmission signal reception failure caused by the LBT failure. In particular, in consideration of the LBT failure in the SRS, the PUCCH, the PRACH, etc., a plurality of resources capable of transmitting a specific message in the form of multiple resources may be allocated in advance, and other resources may be selected and transmitted according to the degree of LBT failure. In this case, it is possible to determine the LBT failure rate of the uplink channel of the corresponding band by determining which region the base station actually uses to transmit a signal in the future. The plurality of resources may be divided and allocated to different time/frequency bands, or different base sequences, messages using different formats, and different spreading/scrambling codes may be applied.

For example, if the transmission is actually performed in the k-th resource after securing n resource regions in the time axis in advance for resource transmission, the base station may be aware of that LBT failures have been made k−1 times before transmission once. Here, it may be known that the LBT success rate is approximately 1/k.

According to another embodiment, the band availability information may be explicitly transmitted through the higher layer. Assuming that the band availability state does not change rapidly over time, performance may be secured even by transmitting information through the higher layer. In this case, the availability information of each subband within the BWP configuration for the UE may be transmitted to the base station through the RRC, and the availability information of all subbands that may be configured to the UE may be transferred to the RRC. Such transmission may be periodically transmitted along with the range, at the request of the base station, or the UE may transmit itself as needed. For example, the corresponding information may be transmitted using CR (Channel Occupancy Ratio) and CBR (Channel Busy Ratio) in the V2X, etc. At this time, each metric is allocated to each of the currently available subbands previously indicated by the base station. For example, if the total number of subbands is 5, the UE may determine 5 CR or CBR values according to the situation of each subband and transmit the corresponding values as the RRC message in the form of CR/CBR reporting.

According to another embodiment, the band availability information may be implicitly delivered through the higher layer. If it is determined that the band availability state of a specific subband among the transmission areas allocated to the UE is bad, the UE may request a change to the allocated BWP or to switch the active BWP to a specific other BWP among a plurality of allocated BWPs. The change request message may include information related to the subband to be avoided, or may request BWP allocation in which the current BWP itself is not included as much as possible. Through the request, the base station may implicitly identify a subband that the UE avoids, that is, the band availability state is bad.

Second Embodiment: Method of Operating a Control Message for Each Provided Band Availability State According to an embodiment, the base station may operate a control message transmitted through the unlicensed band based on the band availability. In particular, the resource allocation method that the base station may select to receive the essential transmission control message may be defined differently according to the band availability, and the resource may be allocated.

According to an embodiment, a method of operating the control message in the downlink may be defined. The base station may store band availability information of each subband of the downlink, and the base station may combine and operate related information when transmitting the control message through the downlink. For example, when the control message of a predetermined position may not be transmitted at a corresponding time, such as a synchronization signal block (SSB) or a paging message, a candidate region to be transmitted may be defined instead. In this case, if the band availability state is bad, there is a need to secure more candidate areas. Therefore, when the base station fails to detect the control message in the corresponding region, the base station may determine information such as the number of additional regions to be attempted based on the corresponding information and transmit the information to the UE. Accordingly, instead of increasing the search complexity of the UE, it is possible to increase the success rate of receiving the essential control messages.

According to another embodiment, a method of operating the control message in the uplink may be defined. The base station may allocate a plurality of candidates for a region capable of transmitting the same information in the uplink in consideration of the uplink LBT failure in terms of time. Accordingly, by giving an opportunity to transmit the same information several times in the time domain, transmission may be performed without additional control feedback even when a certain level of LBT failure occurs.

In this case, the transmission success rate increases as the number of candidates to be allocated increases. However, resource efficiency decreases because resources for other purposes are not allocated to each candidate region. The base station may adjust and allocate the number of candidates for each subband based on the band availability information for each subband provided in advance by the UE. For example, referring to FIG. 14, in a subband in which LBT succeeds only once out of two on average, a transmission area is allocated by repeating twice, and in a subband in which LBT succeeds only once out of four on average the transmission area is allocated by repeating four times so that multiple opportunities may be allocated.

The number of given opportunities may be indicated by the base station when it allocates resources. However, the number of given opportunities may be determined depending on a value transmitted in the uplink. For example, if the number of the LBT transmission failures compared to one LBT success on average in an uplink specific subband is k, and the corresponding value k is shared between the UE and the base station, the base station determines f(k) dependent on k. It is possible to automatically secure and allocate as many candidate areas without additional indications.

Third Embodiment: Method of Reconfiguring Resources for Each Provided Band Availability In general, messages having a large difference between an allocation time and an actual use time in an uplink environment are affected by variable band availability over time. For example, the messages may correspond to a CSI feedback control message or a SRS that is periodically transmitted, a resource region defined by semi-persistent scheduling, and a configured grant region, and the like. It is advantageous to select a subband having a good bandwidth availability environment because the remaining messages other than the RS for a channel environment of a measurement band, such as the SRS among them do not need to be transmitted depending on the band.

According to an embodiment, a method of indicating only subbands to be actually used after allocation of a plurality of subband redundant resources may be defined. Accordingly, a plurality of transmission regions allocated for the CSI feedback control message, the semi-persistent scheduling, and the configured grant may be pre-allocated for each subband, and then a subband to be actually used at a specific time may be delivered in the form of an index or the like. Through this, the UE may determine the subband to be used at the time point.

The UE may attempt to detect the change control message when the state of the currently using subband is not better than the threshold value. In this case, the base station should perform an indication only when a channel situation equal to or greater than the threshold value is received. Alternatively, detection of the change control message may be always attempted, or a corresponding message may be designed to be included in a periodically transmitted DCI.

In the above, description has been made based on the NR-U transmission, but the above-described embodiments may be substantially equally applied in all environments in which the channel availability is applied due to external factors. In addition, the above-described first to third embodiments and sub-methods of each of the embodiments may be applied independently of each other or may be arbitrarily combined and applied.

According to an embodiment of the present disclosure, in the channel environment in which some channels may not be used intermittently due to the external factors such as the NR-U, more stable transmission may be performed through flexible allocation according to the band available environment. In addition, according to the present disclosure, the base station may obtain auxiliary information capable of increasing the resource operation efficiency, and based on this information, the control message and the transport block resource allocation may be performed according to the channel environment.

Hereinafter, structural configurations of a UE and a base station which may perform all or some of the embodiments described above in connection with FIGS. 1 to 24 will be described with reference to the accompanying drawings.

Figure 15:
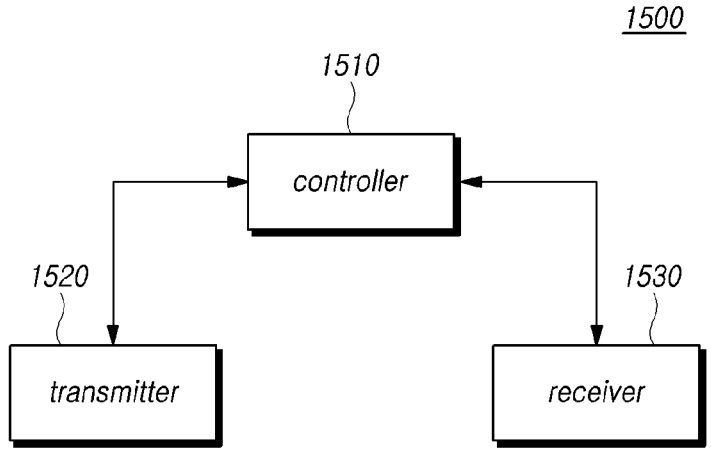
FIG. 15 is a block diagram illustrating a user equipment according to an embodiment.

FIG. 15 is a block diagram illustrating a user equipment according to an embodiment.

Referring to FIG. 15, a UE 1500 according to an embodiment includes a controller 1510, a transmitter 1520, and a receiver 1530.

The controller 1510 controls the overall operation of the UE 1500 according to the method for performing wireless communication in an unlicensed band needed to perform the above-described disclosure. The transmitter 1520 transmits uplink control information and data or messages to the base station via a corresponding channel. The receiver 1530 receives downlink control information and data or messages from the base station via a corresponding channel.

The receiver 1530 may receive information for allocating a radio resource in a system band composed of a plurality of subbands. The base station may allocate the radio resource for the UE to receive the downlink data or to transmit the uplink data to the bandwidth part of the UE. The receiver 1530 may receive allocation information for a resource block (RB) or allocation information for the subband constituting the bandwidth part in the frequency domain. Alternatively, the receiver 1530 may receive allocation information for a transmission start symbol and duration in the time domain. According to an embodiment, the allocation information for the radio resource may be indicated through the downlink control information (DCI).

The controller 1510 may obtain availability information based on performing a Listen Before Talk (LBT) on at least one of subbands included in the radio resource. According to an embodiment, the controller 1510 may perform the LBT on each of at least one subband included in the allocated radio resource. The UE may obtain the availability information based on the LBT result for the subband.

According to an embodiment, the availability information may be determined based on the number of successes and the number of failures of the LBT for each of the at least one subband. For example, the UE may acquire values such as the number of failures versus one success of the LBT for a specific subband, the number of successes versus one failure of the LBT, or an LBT success ratio displayed in the form of an index as the availability information.

The transmitter 1520 may transmit the availability information to the base station. The transmitter 1520 may independently transmit the availability information for each subband. Alternatively, the transmitter 1520 may transmit the combined state information for all subbands related to data transmission. For example, indexes for the subbands with the best channel availability situations may be delivered. Alternatively, the average value of all subbands or subband groups in the currently active bandwidth part (BWP) may be delivered.

According to an example, the transmitter 1520 may explicitly transmit the availability information by including it in the uplink control information. For example, the availability information may be transmitted by being included in UCI for channel state information feedback and transmitted. Alternatively, the transmitter 1520 may transmit the availability information through an independent PUCCH channel by performing channel information feedback based on a subband corresponding to the LBT performance unit. In this case, like the typical CSI, the UE may perform the channel information feedback when requested, or the UE may perform the channel information feedback according to a predetermined period.

According to another embodiment, the transmitter 1520 may explicitly transmit the availability information through the sounding reference signal (SRS). If the base station allocates the radio resource to transmit the SRS, the controller 1520 may perform the LBT when transmitting the SRS. When the LBT for the allocated resource fails, the UE may modify the SRS by reflecting the number of failures in the previously performed LBT performed and transmit the modified SRS at the next SRS transmission.

To this end, the SRS modification method may be preconfigured in relation to the base station. According to an example, the SRS modification method may be interleaving in a mutually agreed form such as a change of an SRS generation parameter, a symbol phase shift, or a cyclic shift. For example, if k consecutive LBT failures occur when attempting to transmit the SRS, the UE may cyclic shift the SRS by k and transmit it.

According to another example, the availability information may be implicitly transmitted according to transmission of the uplink data by the UE. The LBT failure frequency in each subband in the uplink BWP may be expressed as the frequency at which transmission is performed in the allocated resource region. Thus, the base station may indirectly obtain the related information by counting the successfully received transmission.

However, this case does not reflect transmission failure caused by a channel error other than the transmission failure caused by the LBT failure. Accordingly, in order to consider the transmission failure caused by the channel error, etc., a plurality of radio resource regions may be allocated in the form of multiple resources for transmission of the uplink data. The plurality of radio resources may be divided and allocated to different time/frequency bands, or different base sequences, messages using different formats, and different spreading/scrambling codes may be applied. When the LBT failure occurs, the transmitter 1520 may transmit the uplink data by selecting another resource from among the plurality of the allocated radio resources according to a predetermined situation.

The base station may check which region of the allocated radio resource regions is used to transmit the uplink data. Accordingly, the base station may determine the availability information for the corresponding band uplink channel. For example, if n resource regions are allocated in advance in the time axis and transmission is actually performed in the k-th resource region, the base station may know that k−1 LBT failures have been made, and the LBT success rate is approximately 1/k.

The base station may allocate the radio resource for transmission and reception of the downlink or the uplink data based on the received availability information.

According to an embodiment, the plurality of the radio resources may be allocated for transmission and reception of predetermined data based on the availability information. The receiver 1530 may receive the downlink control information (DCI) including information on the plurality of the radio resources. For example, the predetermined data may be an essential transmission control message such as a Synchronization Signal Block (SSB) or a paging message.

The base station may configure a plurality of candidate transmission regions to be used instead when transmission is not possible at an allocated time in relation to transmission of a control message transmitted through the downlink based on the band availability environment information for each of the downlink subbands. In this case, the base station may configure more candidate transmission regions when the band availability state is bad. The UE may receive information on a candidate transmission region to attempt additional detection when message detection fails from the base station. Accordingly, it is possible to increase the success rate of receiving the essential control message.

Alternatively, the base station may allocate the plurality of the radio resources capable of transmitting predetermined information in the uplink based on the band availability information for each subband. Accordingly, the UE is given a plurality of opportunities to transmit the same information in the time domain, and the UE may perform transmission without additional control feedback even when the LBT failure occurs.

In this case, as the number of candidates to be allocated increases, the transmission success rate increases. However, resource efficiency decreases because resources for other purposes are not allocated to each candidate transmission region. Accordingly, the base station may adjust the number of candidate transmission regions for each subband based on the received band availability information for each subband.

According to an embodiment, the base station may select a specific subband from at least one of subbands included in the radio resource based on the availability information. The receiver 1530 may receive the downlink control information (DCI) including information indicating the selected subband. For example, messages having a large difference between an allocation time and an actual use time in an uplink environment, such as a CSI feedback control message, are affected by a variable bandwidth available environment over time. In the case of control messages that do not need to be transmitted depending on the band, it is advantageous for transmission to select a subband having a good available environment.

Accordingly, the base station may allocate the plurality of the transmission regions for corresponding control messages for each subband in advance. The receiver 1530 may receive information indicating a subband to be actually used at a specific time in the form of an index or the like. Through this, the UE may determine the subband to be used at the time point.

In order to change the subband, the controller 1510 may attempt to detect a change control message when the situation of the subband currently being used deteriorates beyond a threshold value. In this case, the base station should perform the indication only when a channel situation deteriorated beyond the threshold value is received. Alternatively, the UE may be configured to always attempt to detect the change control message. Alternatively, it may be configured to include a corresponding message in the periodically transmitted DCI.

Accordingly, by sharing availability information based on the LBT performance results for the plurality of the subbands in the unlicensed band, band operation may be efficiently performed in an environment in which the LBT success probability for each subband is independent and variable.

Figure 16:
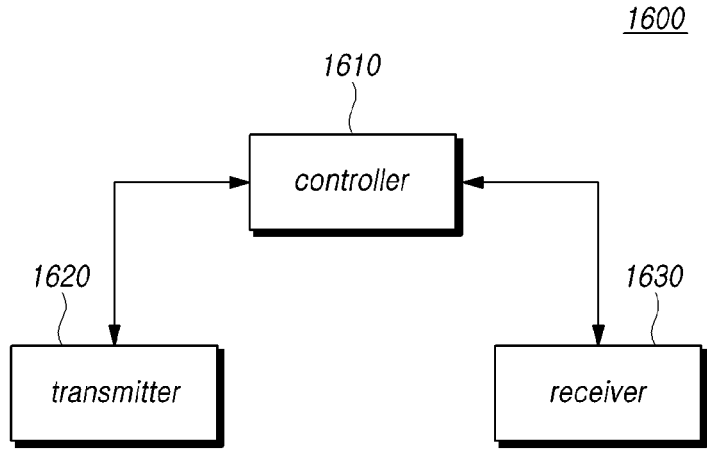
FIG. 16 is a block diagram illustrating a base station according to an embodiment.

FIG. 16 is a block diagram illustrating a base station according to still another embodiment.

Referring to FIG. 16, according to an embodiment, a base station 1600 includes a controller 1610, a transmitter 1620, and a receiver 1630.

The controller 1610 controls the overall operation of the base station 1600 according to the method for performing wireless communication in an unlicensed band needed to perform the above-described disclosure. The transmitter 1620 and the receiver 1630 are used to transmit or receive signals or messages or data necessary for performing the above-described disclosure, with the UE.

The transmitter 1620 may transmit may transmit information for allocating a radio resource in a system band comprising a plurality of subbands. The controller 1610 may allocate the radio resource for the UE to receive the downlink data or to transmit the uplink data to the bandwidth part of the UE. The transmitter 1620 may transmit allocation information for a resource block (RB) or allocation information for the subband constituting the bandwidth part in the frequency domain. Alternatively, the transmitter 1620 may transmit allocation information for a transmission start symbol and duration in the time domain. According to an example, the allocation information for the radio resource may be indicated through the downlink control information (DCI).

The receiver 1630 may receive availability information based on the LBT performance for at least one subband included in the radio resource.

According to an embodiment, the UE may perform the LBT on each of at least one of subbands included in the allocated radio resource. The UE may obtain the availability information based on the LBT result for the subband. The availability information may be determined based on the number of successes and the number of failures of the LBT for each of the at least one subband. For example, the UE may acquire values such as the number of failures versus one success of the LBT for a specific subband, the number of successes versus one failure of the LBT, or an LBT success ratio displayed in the form of an index as the availability information.

According to an embodiment, the receiver 1630 may receive the availability information included in the uplink control information. For example, the availability information may be transmitted by being included in UCI for channel state information feedback. Alternatively, the receiver 1630 may receive the availability information through an independent PUCCH channel by performing channel information feedback based on a subband corresponding to the LBT performance unit.

According to another embodiment, the receiver 1630 may receive the availability information through the sounding reference signal (SRS). If the base station allocates the radio resource to transmit the SRS, the UE may perform the LBT when transmitting the SRS. When the LBT for the allocated resource fails, the UE may modify the SRS by reflecting the number of failures in the previously performed LBT and transmit the modified LBT at the next SRS transmission.

To this end, the SRS modification method may be previously configured in cooperation with the base station. According to an embodiment, the SRS modification method may be a mutually agreed interleaving operation, such as a change of an SRS generation parameter, a symbol phase shift, or a cyclic shift. For example, if k consecutive LBT failures occur when attempting to transmit the SRS, the base station may receive the modified SRS which is cyclic-shifted by k.

According to another embodiment, the availability information may be explicitly delivered through an RRC message of the UE. For example, a channel busy ratio (CBR) may be calculated based on the LBT failure frequency in each subband in the uplink BWP, and this may be transmitted through a CBR reporting RRC message. The controller 1610 may obtain channel availability status information for each uplink subband of a corresponding user through the CBR reporting RRC message.

According to another embodiment, the availability information may be implicitly transmitted according to transmission of the uplink data by the UE. The LBT failure frequency in each subband in the uplink BWP may be expressed as the frequency at which transmission is performed in the allocated resource region. Thus, the controller 1610 may indirectly obtain the related information by counting the successfully received transmission.

However, this case does not reflect transmission failure caused by a channel error other than the transmission failure caused by the LBT failure. Accordingly, in order to consider the transmission failure caused by the channel error, etc., a plurality of radio resource regions may be allocated in the form of multiple resources for transmission of the uplink data. The plurality of radio resources may be divided and allocated to different time/frequency bands, or different base sequences, messages using different formats, and different spreading/scrambling codes may be applied. When the LBT failure occurs, the UE may transmit the uplink data by selecting another resource from among the plurality of the allocated radio resources according to a predetermined situation.

The controller 1610 may check which region of the allocated radio resource regions is used to transmit the uplink data. Accordingly, the controller 1610 may determine the availability information for the corresponding band uplink channel. For example, if n resource regions are allocated in advance in the time axis and transmission is actually performed in the k-th resource region, the controller 1610 may be aware of that k−1 LBT failures have been made, and the LBT success rate is approximately 1/k.

The controller 1610 may allocate the radio resource for transmission and reception of the downlink or the uplink data based on the received availability information.

According to an embodiment, the plurality of the radio resources may be allocated for transmission and reception of predetermined data based on the availability information. The transmitter 1630 may transmit the downlink control information (DCI) including information on the plurality of the radio resources. For example, the predetermined data may be an essential transmission control message such as a Synchronization Signal Block (SSB) or a paging message.

The controller 1610 may configure a plurality of candidate transmission regions to be used instead when transmission is not possible at an allocated time in relation to transmission of a control message transmitted through the downlink based on the band availability environment information for each of the downlink subbands. In this case, the base station may configure more candidate transmission regions when the available bandwidth environment is bad. The base station may transmit information on a candidate transmission region to attempt additional detection when message detection fails to the UE. Accordingly, it is possible to increase the success rate of receiving the essential control message.

Alternatively, the controller 1610 may allocate the plurality of the radio resources capable of transmitting predetermined information in the uplink based on the band availability information for each subband. Accordingly, the UE is given a plurality of opportunities to transmit the same information in the time domain, and the UE may perform transmission without additional control feedback even when the LBT failure occurs.

In this case, as the number of candidates to be allocated increases, the transmission success rate increases. However, resource efficiency decreases because resources for other purposes are not allocated to each candidate transmission region. Accordingly, the controller 1610 may adjust the number of candidate transmission regions for each subband based on the received band availability information for each subband.

According to an embodiment, the controller 1610 may select a specific subband from at least one of subbands included in the radio resource based on the availability information. The UE may receive the downlink control information (DCI) including information indicating the selected subband. For example, messages having a large difference between an allocation time and an actual use time in an uplink environment, such as a CSI feedback control message, are affected by a variable bandwidth available environment over time. In the case of control messages that do not need to be transmitted depending on the band, it is advantageous for transmission to select a subband having a good available environment.

Accordingly, the controller 1610 may allocate the plurality of the transmission regions for corresponding control messages for each subband in advance. The UE may receive information indicating a subband to be actually used at a specific time in the form of an index or the like. Through this, the UE may determine the subband to be used at the time point.

In order to change the subband, the UE may attempt to detect a change control message when the state of the currently using subband deteriorates beyond a threshold value. In this case, the transmitter 1620 should transmit the indication only when channel state deteriorates beyond the threshold value. Alternatively, the UE may be configured to always attempt to detect the change control message. Alternatively, it may be configured to include a corresponding message in the periodically transmitted DCI.

Accordingly, by sharing availability information based on the LBT performance results for the plurality of the subbands in the unlicensed band, band operation may be efficiently performed in an environment in which the LBT success probability for each subband is independent and variable.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

The invention claimed is:

1. A method for performing wireless communication by a user equipment (UE) in an unlicensed band, the method comprising:

receiving information for allocating a radio resource in a system band made up of a plurality of subbands;

acquiring availability information based on performing a Listen Before Talk (LBT) on at least one of subbands in a bandwidth part (BWP) included in the radio resource; and transmitting uplink control information including the availability information, wherein one of multiple LBT schemes, including a no LBT scheme, a LBM scheme without a random backoff, a fixed backoff LBT scheme, or a variable random backoff LBT scheme, is determined based on a timing gap between a downlink transmission and a uplink transmission in channel occupancy time (COT) of the base station, wherein the BWP is switched to another BWP among a plurality of BWPs allocated to the UE when the availability information indicates that a state of the at least one of subbands deteriorates beyond a threshold value, and wherein the availability information is determined based on a number of successes and a number of failures in the LBT for each subband.

2. The method of claim 1, further comprising: receiving downlink control information comprising information on a plurality of radio resources allocated for transmission and reception of predetermined data based on the availability information.

3. The method of claim 1, further comprising: receiving downlink control information comprising information indicating a selected subband among subbands included in the radio resource based on the availability information.

4. A method for performing wireless communication by a base station in an unlicensed band, the method comprising:

transmitting information for allocating a radio resource in a system band made up of a plurality of subbands; and receiving uplink control information including availability information based on performing a Listen Before Talk (LBT) on at least one of subbands in a bandwidth part (BWP) included in the radio resource, wherein one of multiple LBT schemes, including a no LBT scheme, a LBM scheme without a random backoff, a fixed backoff LBT scheme, or a variable random backoff LBT scheme, is determined based on a timing gap between a downlink transmission and a uplink transmission in channel occupancy time (COT) of the base station, wherein the BWP is switched to another BWP among a plurality of BWPs allocated to the UE when the avail- ability information indicates that a state of the at least one of subbands deteriorates beyond a threshold value, and wherein the availability information is determined based on a number of successes and a number of failures in the LBT for each subband.

5. The method of claim 4, further comprising: transmitting downlink control information including information on a plurality of radio resources allocated for transmission and reception of predetermined data based on the availability information.

6. The method of claim 4, further comprising: transmitting downlink control information including information indicating a selected subband among subbands included in the radio resource based on the availability information.

7. A user equipment (UE) for performing wireless communication in an unlicensed band, the UE comprising:

a receiver configured to receive information for allocating a radio resource in a system band made up of a plurality of subbands;

a controller configured to acquire availability information based on performing a Listen Before Talk (LBT) on at least one of subbands in a bandwidth part (BWP) included in the radio resource; and a transmitter configured to transmit uplink control information including the availability information, wherein one of multiple LBT schemes, including a no LBT scheme, a LBM scheme without a random back-off, a fixed backoff LBT scheme, or a variable random backoff LBT scheme, is determined based on a timing gap between a downlink transmission and a uplink transmission in channel occupancy time (COT) of the base station, wherein the BWP is switched to another BWP among a plurality of BWPs allocated to the UE when the avail- ability information indicates that a state of the at least one of subbands deteriorates beyond a threshold value, and wherein the availability information is determined based on a number of successes and a number of failures in the LBT for each subband.

8. The UE of claim 7, wherein the receiver receives downlink control information including information on a plurality of radio resources allocated for transmission and reception of predetermined data based on the availability information.

9. The UE of claim 7, wherein the receiver receives downlink control information including information indicat- ing a selected subband among at least one of subbands included in the radio resource based on the availability information.

* * * * *